March 8, 1949.　　　　E. J. CRAWFORD　　　　2,463,855
SEED AND FERTILIZER DISTRIBUTOR
Filed April 17, 1944

Inventor
Edward J. Crawford,
By McMorrow and Berman
Attorneys

Patented Mar. 8, 1949

2,463,855

UNITED STATES PATENT OFFICE 2,463,855

SEED AND FERTILIZER DISTRIBUTOR

Edward J. Crawford, Van Buren, Ark.

Application April 17, 1944, Serial No. 531,423

1 Claim. (Cl. 275—8)

The present invention relates to new and useful improvements in farm equipment, more particularly to a seed and fertilizing distributor adapted for attachment to a tractor or other power driven implement, and has for its primary object to provide means for regulating the discharge of the seed or fertilizer from a hopper and also embodying means for scattering the seed or fertilizer toward the side of the vehicle.

Another object is to provide an apparatus of this character of simple and practical construction which may be mounted as a unit on a conventional farm tractor, and which at the same time is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
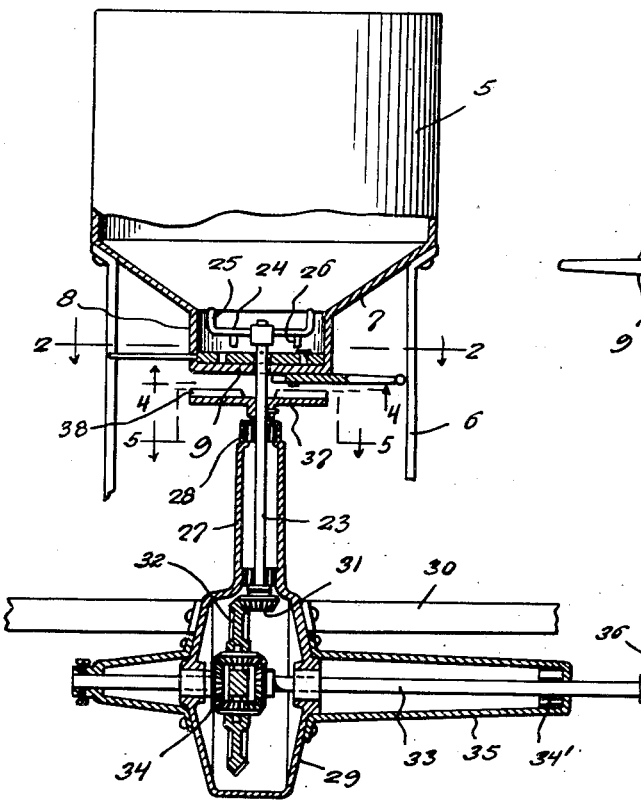
Figure 1 is a view in elevation with parts shown in section.
Figure 4:
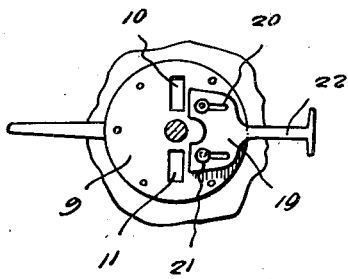
Figure 4 is a sectional view taken substantially on a line 4—4 of Figure 1.
Figure 3:
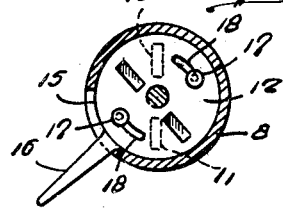
Figure 3 is a similar view showing the valve in closed position.
Figure 2:
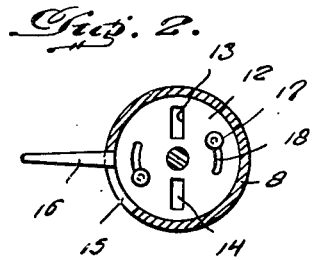
Figure 2 is a sectional view taken substantially on a line 2—2 of Figure 1, and showing the control valve in open position.

Referring now to drawing in detail, wherein for the purpose of illustration I have disclosed a preferred embodiment of the invention, the numeral 5 designates a hopper adapted to contain seed or fertilizer and supported by legs 6 from a suitable part of a farm tractor or other motor driven farm implement.

The bottom of the hopper is inclined, as shown at 7, toward a central neck 8 having a closed bottom 9 and formed with a pair of slotted discharge openings 10 and 11, the openings being arranged in longitudinal alignment with respect to the vehicle and forwardly and rearwardly, respectively, of the center of the neck 8.

A valve 12 in the form of a disc is rotatably mounted in the bottom of the neck 8 of the hopper, the valve having slotted openings 13 and 14 therein adapted to register with the openings 10 and 11. An opening 15 is formed in one side of the neck 8 for receiving a handle 16 projecting from one edge of the valve to move the latter into its open or closed position. The valve 12 may also be secured to the bottom 9 of the neck of the hopper by means of pins 17 extending upwardly from the bottom 9 through arcuate slotted openings 18 formed in the valve.

The bottom 9 is also provided with a feed gauge 19 in the form of a plate having spaced parallel slotted openings 20 therein slidable on pins 21 extending downwardly from the bottom 9 and with one edge of the gauge 19 adapted for movement across the openings 10 or 11 to regulate the volume of material discharged from the hopper. A manipulating handle 22 extends from one edge of the gauge 19.

A shaft 23 extends upwardly through the bottom 9 and through the valve 12 into the neck 8 of the hopper and to the upper end of the shaft is secured an agitator 24 in the form of laterally extending rods having upturned ends 25 and downwardly extending lugs 26. The lower portion of the shaft 23 is mounted in a housing 27 by means of bearings 28, the housing 27 extending upwardly from a gear housing 29 which is also secured to the tractor by means of brackets 30. The lower end of the shaft 23 is provided with a pinion 31 driven by a ring gear 32 in the housing 29, the ring gear being operatively connected with a horizontal shaft 33 by means of a differential gear mechanism 34 of conventional construction. The shaft 33 is journaled in bearings 34' mounted in a housing 35, the shaft 33 extending outwardly from the end of the housing 35 and provided with a drive pulley 36 or other drive connection adapted to be driven from a conventional power take-off or other drive means of the tractor.

Figure 5:
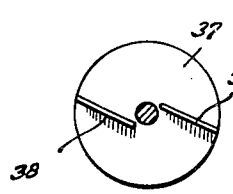
Figure 5 is a sectional view taken substantially on a line 5—5 of Figure 1, and illustrating the seed and fertilizer scatterer.

A scatterer 37 is secured to the shaft 23 immediately below the bottom 9 of the hopper, the scatterer being in the form of a disc having vanes 38 on the upper surface thereof. As shown in Figure 5, the vanes 38 comprise a substantially diametrically and oppositely-disposed pair of upstanding blades or ribs.

In the operation of the device, it will be apparent that the valve 12 will control the discharge of the seed or fertilizer from the openings 10 and 11 in the bottom 9 of the hopper and the gauge 19 is adapted to regulate the volume of material discharged therefrom. The seed or fertilizer discharged from the hopper will drop upon the scatterer 37 at two diametrical points in alignment at opposite sides of the axis of the scatterer and longitudinally of the vehicle so that, due to the form and arrangement of said vanes 38, the so deposited material will be thrown laterally from opposite sides of the scatterer by the vanes.

By arranging the discharge openings 10 and 11 at the front and rear of the axis of the scatterer and longitudinally of the direction of travel of the machine, the scatterer will distribute the greater portion of the material more nearly directly and laterally toward the sides of the tractor or other vehicle rather than circularly from the center thereof.

It is believed the details of construction, operation and advantages of the device will be readily understood from the foregoing without further detailed explanation.

Having thus described the invention, what I claim is:

In a feed and fertilizer distributor, comprising a hopper adapted to be mounted on a vehicle and having a substantially horizontal bottom provided with a pair of front and rear openings spaced in longitudinal alignment with respect to the longitudinal dimension of said vehicle, a valve member rotatably mounted upon the bottom of the hopper and having a pair of openings therein registering with the front and rear openings of said bottom in one rotated position of the valve member and closing the latter openings in another rotated position of said valve member, a handle projecting from said valve member for rotating the latter to open and close said openings, a driven shaft extending rotatably upward through the bottom of said hopper and through said valve member, an agitator fixed on the upper portion of the shaft above the latter valve member, and a scattering disc fixed on said shaft a predetermined distance below the bottom of said hopper, the features which include having the openings in said bottom and said valve radially elongated to form radial slots which are mutually aligned in each pair, a gauge member slidably mounted beneath said bottom and above said scattering disc for sliding movement transversely of the vehicle, a pair of end portions on the inner extremity of the gauge member parallel to said longitudinal dimension of said vehicle and shiftable by movement of said gauge member to variably cover the two longitudinally disposed radial slots in the bottom of said hopper simultaneously, and a handle on said gauge member for moving the latter and regulating the amount of feed or fertilizer issuing from said radial slots in said bottom at will.

EDWARD J. CRAWFORD.

REFERENCES CITED

The following references are of record in the file of this patent:

UNITED STATES PATENTS

| Number | Name | Date |
|---|---|---|
| 79,301 | Beaumont | June 30, 1868 |
| 926,160 | Wingreen | June 29, 1909 |
| 1,459,915 | Koehmstedt | June 26, 1923 |
| 1,619,795 | Roby | Mar. 1, 1927 |
| 2,162,103 | Middleton | June 13, 1939 |
| 2,334,376 | Bauer | Nov. 16, 1943 |
| 2,340,657 | Goertzen | Feb. 1, 1944 |

FOREIGN PATENTS

| Number | Country | Date |
|---|---|---|
| 59,211 | Sweden | Oct. 13, 1922 |